US011987301B2

United States Patent
Timmermans (10) Patent No.: US 11,987,301 B2
(45) Date of Patent: May 21, 2024

(54) DRIVE TRACKS AND SOLAR PANEL CLEANING ROBOT COMPRISING SUCH TRACKS

(71) Applicant: SolarCleano S.àr.l., Bascharage (LU)

(72) Inventor: Christophe Timmermans, Walferdange (LU)

(73) Assignee: SOLARCLEANO S.À R.L., Bascharage (LU)

( * ) Notice: Subject to any disclaimer, the term of this patent is extended or adjusted under 35 U.S.C. 154(b) by 427 days.

(21) Appl. No.: 17/599,713

(22) PCT Filed: Mar. 12, 2020

(86) PCT No.: PCT/EP2020/056736
§ 371 (c)(1),
(2) Date: Sep. 29, 2021

(87) PCT Pub. No.: WO2020/200694
PCT Pub. Date: Oct. 8, 2020

(65) Prior Publication Data
US 2022/0055698 A1    Feb. 24, 2022

(30) Foreign Application Priority Data
Mar. 29, 2019   (LU) ........................................ 101166

(51) Int. Cl.
*B62D 55/075*   (2006.01)
*A46B 13/00*    (2006.01)
(Continued)

(52) U.S. Cl.
CPC .......... *B62D 55/075* (2013.01); *A46B 13/001* (2013.01); *A46B 13/02* (2013.01);
(Continued)

(58) Field of Classification Search
CPC .................. A46B 13/001; A46B 13/02; A46B 2200/3073; A47L 1/02; A47L 2201/00;
(Continued)

(56) References Cited

U.S. PATENT DOCUMENTS

| 4,378,133 A | 3/1983 | Trautwein |
| 2011/0240382 A1 | 10/2011 | Gettings et al. |
| 2015/0349706 A1* | 12/2015 | Grossman ................. B08B 1/12 134/6 |

FOREIGN PATENT DOCUMENTS

| CN | 104802867 A * | 7/2015 | ........... B62D 55/065 |
| WO | 2014/005495 A1 | 1/2014 | |
| WO | 2019024739 A1 | 2/2019 | |

OTHER PUBLICATIONS

International Search Report with the English translation and Written Opinion of the International Searching Authority dated Jun. 16, 2020 in corresponding International application No. PCT/EP2020/056736; 9 pages.
(Continued)

*Primary Examiner* — Randall E Chin
(74) *Attorney, Agent, or Firm* — Maier & Maier, PLLC (57) ABSTRACT

A drive track for a cleaning robot moving on inclined surfaces such as photovoltaic panels has a multilayer structure comprising: an internal layer formed by a continuous belt having an internal face able to engage with means for driving the track; an intermediate layer including a plurality of damping blocks disposed over the entire length of the continuous belt of the internal layer with a predefined separation (e); and an external running layer coming into contact with the surface on which the track moves, the running layer being formed by pads supported by the damping blocks. The damping blocks are made of elastomer material and have a cellular structure with a plurality of parallel trough-channels.

20 Claims, 5 Drawing Sheets

(51) Int. Cl.

| | | |
|---|---|---|
| *A46B 13/02* | (2006.01) | |
| *B08B 1/12* | (2024.01) | |
| *B08B 1/30* | (2024.01) | |
| *B08B 1/32* | (2024.01) | |
| *B62D 55/08* | (2006.01) | |
| *B62D 55/18* | (2006.01) | |
| *B62D 55/24* | (2006.01) | |
| *B62D 55/26* | (2006.01) | |
| *F24S 40/20* | (2018.01) | |
| *H02S 40/10* | (2014.01) | |

(52) U.S. Cl.
CPC ............... *B08B 1/12* (2024.01); *B08B 1/30* (2024.01); *B08B 1/32* (2024.01); *B62D 55/08* (2013.01); *B62D 55/18* (2013.01); *B62D 55/24* (2013.01); *B62D 55/26* (2013.01); *A46B 2200/3073* (2013.01); *A47L 2201/00* (2013.01); *F24S 40/20* (2018.05); *H02S 40/10* (2014.12)

(58) Field of Classification Search
CPC ...... B62D 55/00; B62D 55/06; B62D 55/075; B62D 55/08; B62D 55/18; B62D 55/24; B62D 55/242; B62D 55/26; F24S 40/20; H02S 40/10; B08B 1/12
See application file for complete search history.

(56) References Cited

OTHER PUBLICATIONS

Böhrnsen et al., "Battery-powered and with reversible brushes"; Profi, The Farm Machinery Magazine; Oct. 2018; (18 pp., including machine-generated English translation).

\* cited by examiner

DRIVE TRACKS AND SOLAR PANEL CLEANING ROBOT COMPRISING SUCH TRACKS

TECHNICAL FIELD

The present invention relates generally to the field of tracked vehicles designed to move on inclined planes such as photovoltaic panels.

BACKGROUND

The development of renewable energies is growing rapidly. Many sets of solar panels are installed today, whether in photovoltaic solar power plants or on industrial roofs.

It is important to be able to clean the surface of these solar panels in order to ensure their efficiency.

Cleaning can be done manually, for example by operators using poles.

Brush cleaning robots have also been developed. One of the difficulties of cleaning is linked to the fact that the solar panels are generally inclined, and wet during the cleaning. The manufacturer of the robot must thus be able to guarantee the adhesion of the cleaning robots on slopes greater than 10° or 25°.

To date, suction cup robots are known, an adaptation of the glass tower cleaning robot. Its adhesion on steep slopes is excellent, but the cost is expensive.

Cleaning robots equipped with a pair of drive tracks, which can comprise an outer running layer made from structured rubber or leather, are also known. Two difficulties are observed in practice with the known tracks. First of all, if the panels are generally planar, the support structure of the panels forms surface irregularities (in particular protrusions linked to the frames and screws) which tend to peel off the tracks and therefore reduce the adhesion of the tracks on the surface. In addition, these metal screws and protrusions may damage the tracks and the allocation of the robot's weight unevenly over a smaller surface can damage the panels by creating or enlarging the microcracks related to a too much pressure on the panel.

SUMMARY

The object of the present invention is to provide drive tracks for a cleaning robot, and a robot equipped with such tracks allowing a good adhesion on the inclined surfaces such as solar panels, in particular in the presence of surface irregularities formed by frames, screws etc.

In order to achieve this objective, the invention proposes a drive track for a vehicle moving on inclined surfaces, which has a multilayer structure comprising:
- an inner layer formed by a continuous strip having an inner face capable of cooperating with means for driving the track;
- an intermediate layer including a plurality of damping blocks disposed over the entire length of the continuous strip of the inner layer with a predefined spacing, the damping blocks being made of an elastomer material and having a cellular structure; preferably the cellular structure is formed by a plurality of parallel through channels;
- an outer running layer coming into contact with the surface on which it moves, the running layer being formed by pads carried by the flexible blocks.

It will be appreciated that the damping blocks provided in the track according to the invention allow, thanks to the cellular structure, dosing the damping and therefore the individual crushing of the blocks. It is thus possible to absorb local deformations of the surface on which the robot moves, without causing an overall peeling of the track, because the deformation is caused at the block. The adhesion is thus improved. The flexibility, or cushioning, of the intermediate layer also contributes to better load distribution. Furthermore, the intermediate layer allows a certain flexibility between the inner layer and the outer layer which facilitates the rotation during a turn of the robot.

In addition to the good mechanical behavior of the tracks described above, the use of an elastomer, in combination with a cellular structure, confers a good resistance/tenacity of the intermediate layer, in particular on cutting ridges of metal frames, screws, etc. . . . . . Tests have shown in particular that the choice of an elastomer with an appropriate hardness confers a service life to the track significantly greater than that of a track in which the intermediate layer is a polymer foam of the neoprene type, for example.

Tests carried out with the tracks according to the invention have allowed to confirm the good adhesion of a cleaning robot on wet inclined planes up to inclination angles greater than 25°.

According to embodiments, the damping blocks have the general shape of a parallelepiped, in particular a straight parallelepiped. In practice, each block has thus a width, a length and a thickness. Each damping block supports, on a face parallel to the strip of the inner layer, a pad. Such a pad is for example substantially rectangular and its width corresponds to the width of the continuous strip of the inner layer.

The blocks are preferably sized so that their width corresponds to the width of the strip, the length of the block therefore being its dimension in the direction of the length of the strip (even if it is less than the width). The channels forming tubular cells preferably extend parallel, in the direction of the width of the block, therefore transversely to the length of the continuous strip, respectively of the track. Thus, the faces of the blocks extending in the direction of the length of the track are faces into which the channels open.

Furthermore, the cellular structure is preferably of the honeycomb type.

The fixing of the pads to the damping blocks and of the damping blocks to the continuous strip is advantageously done by gluing, but any appropriate means may be used.

The damping blocks and the pads are made of elastomers, for example natural or synthetic rubber. EPDM can be used in particular for the damping blocks and natural rubber for the pads. The hardness of the elastomer of the damping blocks is greater than that of the pads. In particular, the hardness of the elastomer selected for the damping blocks is preferably comprised between 60 and 80 degrees Shore A, preferably between 65 and 70 degrees Shore A. The pads are preferably made of an elastomer having a hardness in the range of 35 to 50 degrees Shore A, in particular between 40 and 45 degrees Shore A.

The spacing between the damping blocks allows their deformation. This predetermined spacing (e) can correspond to at least 5% or 20% of the thickness (d3) of a block, preferably at least 30, 40 or 50% of the thickness of a block.

Advantageously, the pads have a contact surface with a plurality of open cavities on the contact surface and forming a predetermined pattern, the surface cavity ratio being less than 50%. The cavities have a dual function of water discharge and adhesion.

The cavities are typically formed in the thickness of the pad and delimited by a wall surface and a bottom surface, each wall surface intersecting the contact face according to a closed ridge contour. For example, the cavities have a depth of 2 mm or more and the area defined by the closed ridge contour is comprised between 12 and 80 mm$^2$, preferably between 16 and 36 mm$^2$.

According to another aspect, the invention relates to a robot, in particular for cleaning inclined surfaces, comprising:
- a chassis supporting a propulsion group;
- a pair of traction tracks in accordance with the first aspect, mounted on either side of the chassis for the displacement of the robot, the tracks being supported and driven by means for driving the track cooperating with the propulsion group; and
- at least one brush for cleaning the surface on which the robot moves.

According to variants, the robot comprises two rotary cleaning brushes, mounted transversely to the axis of displacement of the robot, one brush at each end of the robot; and brush drive means designed to drive the brushes in two directions.

According to variants, the chassis forms a support frame for a basket, the basket comprising a robot control module as well as batteries intended to power all on-board equipment, in particular the control module, the propulsion group and the brush drive means.

The cleaning brush(es) is/are advantageously mounted on the chassis by removable fixing means, and the basket is removably housed in the chassis.

The pressure exerted by the robot on the photovoltaic panels depends on the mass of the robot and the contact surface. In the context of the present robot, the number of pads of the track, their dimensions and surface cavity ratio are determined such that the pressure applied by the pads on the panels is less than about 5000 Pa, in particular less than about 4200 Pa.

BRIEF DESCRIPTION OF THE FIGURES

Other features and characteristics of the invention will emerge from the detailed description of at least one advantageous embodiment presented below, by way of illustration, with reference to the appended drawings. These show.

DETAILED DESCRIPTION

The present invention will now be described based on an example of application to solar panel cleaning robots of such as photovoltaic panels.

Figure 1:
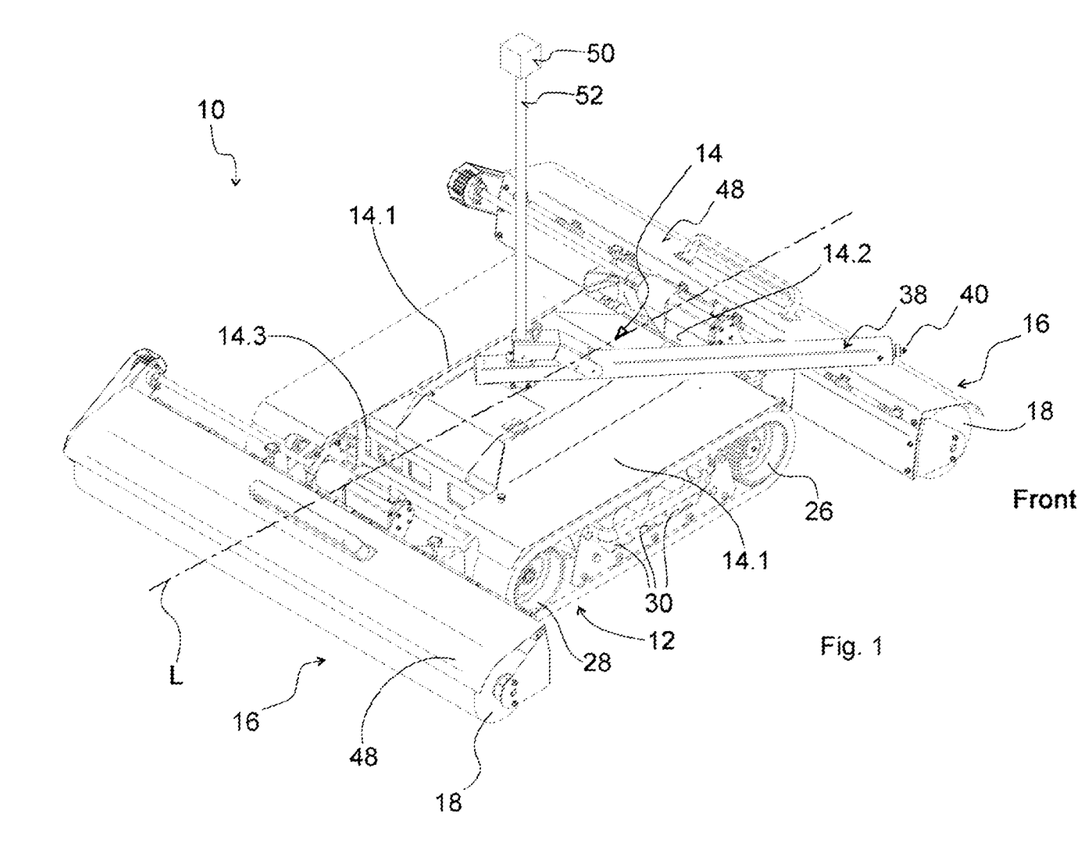
FIG. 1: a perspective view of a cleaning robot equipped with a pair of drive tracks according to a variant of the invention.

FIG. 1 shows a perspective view of a solar panel cleaning robot 10 (not represented) equipped with a pair of drive tracks 12 according to one embodiment of the invention.

The robot 10 comprises a chassis 14 supporting a propulsion group. The traction tracks 12 are mounted on either side of the chassis 14 for the displacement of the robot 10, the tracks 12 being supported and driven by means for driving the track cooperating with the propulsion group.

The chassis 14 has a generally rectangular shape with 4 sides: two lateral sides 14.1 and two transverse sides including a front side 14.2 and a rear side 14.3. According to the present variant, the four sides are formed by profiles forming a frame and a support for a basket (shown in FIG. 6). In FIG. 1, the robot longitudinal axis is represented, designated L, along which it is displaced by means of the tracks.

Two brush-modules 16 are mounted on the transverse sides 14.2 and 14.3. They each comprise a brush 18 (represented schematically by a cylinder) extending perpendicularly to the axis L and beyond the lateral edges of the chassis 14 equipped with the tracks 12.

Figure 2:
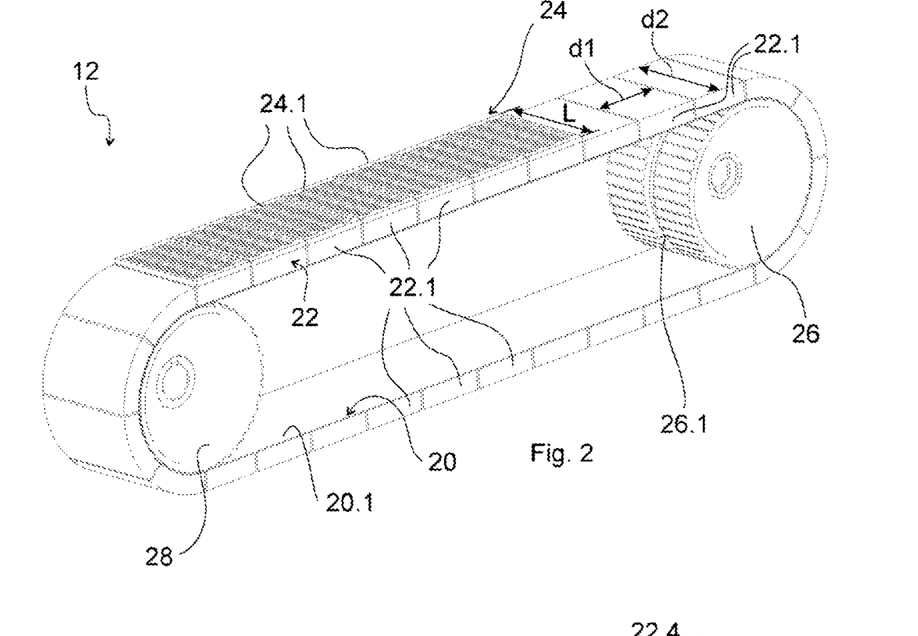
FIG. 2: a perspective view of one of the drive tracks of FIG. 1.

As best seen in FIG. 2, the track 12 includes three layers.

An inner layer 20 is formed by a continuous strip having an inner face 20.1 capable of cooperating with means for driving the track. The continuous strip 20 is preferably manufactured endlessly (in one piece) of an elastic material, such as an elastomer with reinforcement, in the manner of a belt. On the inner face 20.1 thereof, the continuous strip advantageously has a relief (not shown) intended to improve the drive on the pulleys of the drive means.

The reference sign 24 generally designates an outer running layer coming into contact with the surface on which the track, respectively the robot, moves. This outer layer is formed of a plurality of pads 24.1.

The track 12 further comprises an intermediate layer 22 of connection between the inner 20 and outer 24 layers, formed by a plurality of damping blocks 22.1 disposed over the entire length of the strip 20 of inner layer, on the side of its outer face 20.2 opposite to the inner face 20.1. Each flexible block 22.1 has a parallelepiped shape, and supports, on a face parallel to the strip of the inner layer, a pad 24.1. The blocks 22.1 are linked by a single face to the strip 20 and are not linked to each other, that is to say, they are spaced in the longitudinal direction of the strip 20.

d1 is referred to as the dimension of a block 22.1 in the direction of the strip 20 (parallel to the axis L), d2 as the width of the block which corresponds to the width of the strip 20, and d3 as the thickness of the block.

It is possible, for example, to have: d1: 55 to 75 mm; d2: 80 to 120 mm; and d3: 15 to 30 mm.

Figure 4:
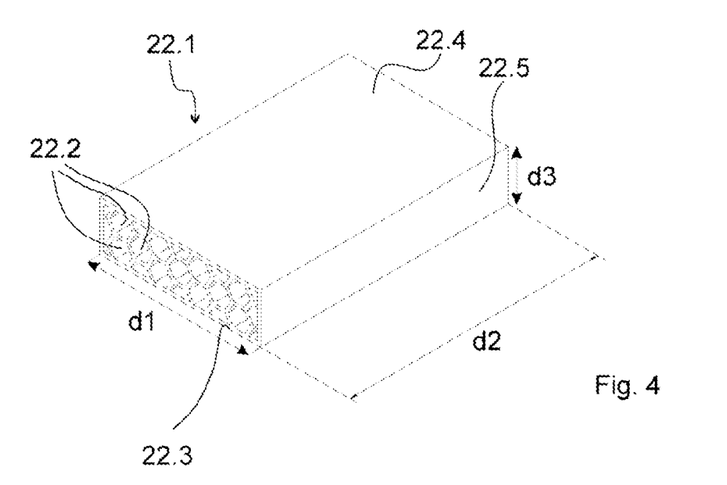
FIG. 4: a perspective view of a damping block.
Figure 5:
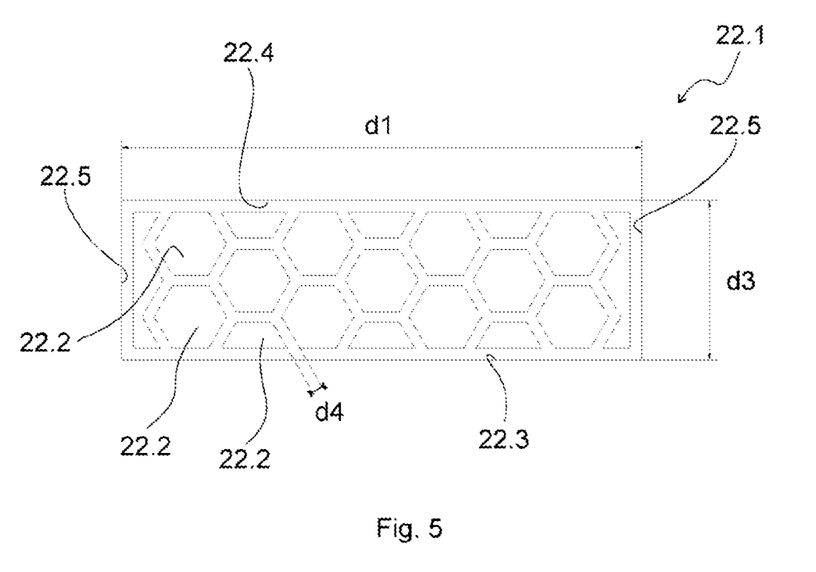
FIG. 5: a side view of a damping block.

It will be particularly noted the design of the damping blocks 22.1 which are made of an elastomeric material and have a cellular structure with a plurality of parallel through channels 22.2. As will be better understood from FIGS. 3 to 5, the blocks 22.1 comprise four parallel walls, and one distinguishes: an inner wall 22.3 in contact with the outer surface 20.1 of the strip 20, an outer wall 22.4 carrying a pad 24.1, and two lateral walls 22.5 joining these two walls. The solid walls 22.3, 22.4 and 22.5 therefore define an interior volume which accommodates the channels 22.2. The channels are called through channels, because they extend over the entire width d2 of the block; they therefore open into the end faces of the blocks 22.1 coinciding with the edges of the strip 20. In the present variant, the channels 22.2 are made to form a honeycomb-type cellular structure, that is to say with hexagonal section channels. The wall thickness of the channels 22.2, denoted d4, can be, by way of example, in the range of 1 to 3 mm, in particular 1.5 or 2 mm.

Figure 3:
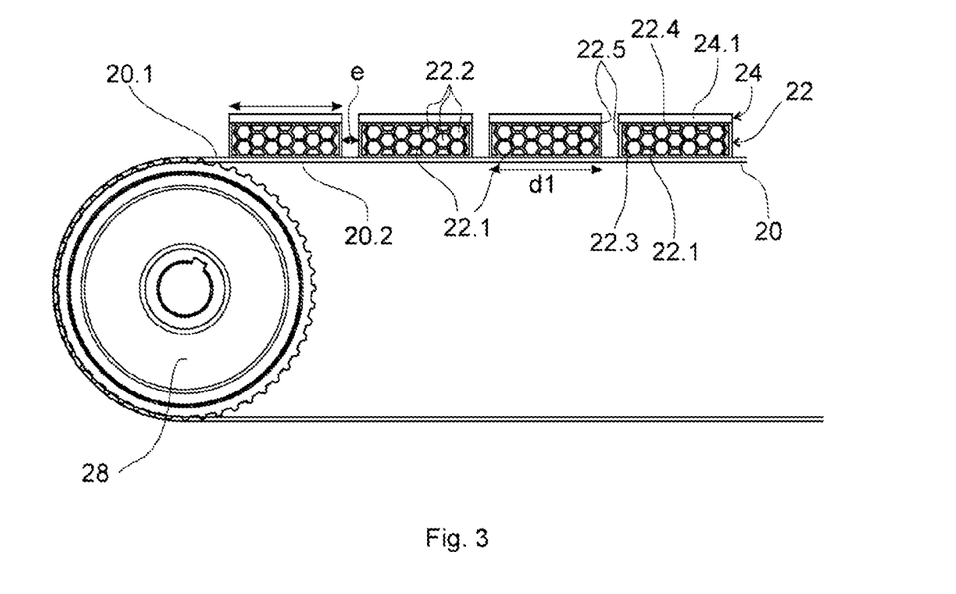
FIG. 3: a view illustrating the principle of construction of the track of FIG. 1.

The blocks 22.1 are arranged over the entire length of the strip 20 with a predetermined spacing therebetween, denoted e in FIG. 3. This predetermined spacing corresponds to at least 5% or 20% of the thickness d3 of a block, preferably at least 40 or 50% of the thickness d3 of a block. This gives a little space which allows the deformation of the block, in particular of the lateral walls 22.5, under the pressure of the robot and/or in contact with the roughness of the solar panels.

The block structuration of the intermediate layer 22, combined with the flexibility, allows a local deformation on the surface irregularities (screw, frame, etc.) which prevents the entire track from detaching from the surface. This block design is therefore favorable to the absorption of the shapes and vibrations, as well as to load distribution and damping. This therefore results in an improved adhesion. Furthermore, the intermediate layer 22 allows a certain flexibility between the inner layer 20 and the pads 24.1 of the outer layer 24 which facilitates the rotation of the pads on themselves over a few degrees during a turn of the robot.

The blocks 22.1 are made of an elastomeric material; any appropriate elastomer can be used, natural or synthetic rubber. The EDPM rubber is advantageously selected for its good resistance to weathering and washing agents. The elastomer used for the blocks 22.1 preferably has a hardness comprised between 60 and 80 degrees Shore A, in particular between 65 and 70 degrees Shore A.

It will be noted that in FIG. 2 only few pads 24.1 are represented, but in practice each damping block 22.1 of the intermediate layer 24 carries a pad 24.1.

In the present variant, the means for driving the tracks 12 comprise, on either side of the robot 10, a drive pulley 26 and a return pulley 28. These pulleys 26, 28 have profiles on their outer surface which cooperate with the profile of the inner surface 20.1 of the belt 20, for a good transmission of the driving force. A central guiding rib (not shown) extends over the inner face 20.1 of the belt and is engaged in a central groove formed in each of the pulleys or rollers of the track drive and support means. The central groove 26.1 of the drive pulley 26 is visible in FIG. 2.

Running rollers 30 are provided in the lower portion, between the two pulleys 26 and 28, equalizing the pressure on the surface to be cleaned. These rollers also comprise a central groove for the central guide rib and belt guides are installed on either side of these rollers.

By way of example, the track 12 may have a total length (dimension of the belt forming the inner layer) in the range of 1200 mm to 2400 mm, in particular of 1800 to 2000 mm. The width of the belt can be from 70 to 130 mm, for example 100 mm. The pulleys 26 and 28 can have diameters between 80 and 200 mm, for example between 120 and 150 mm.

Figure 6:
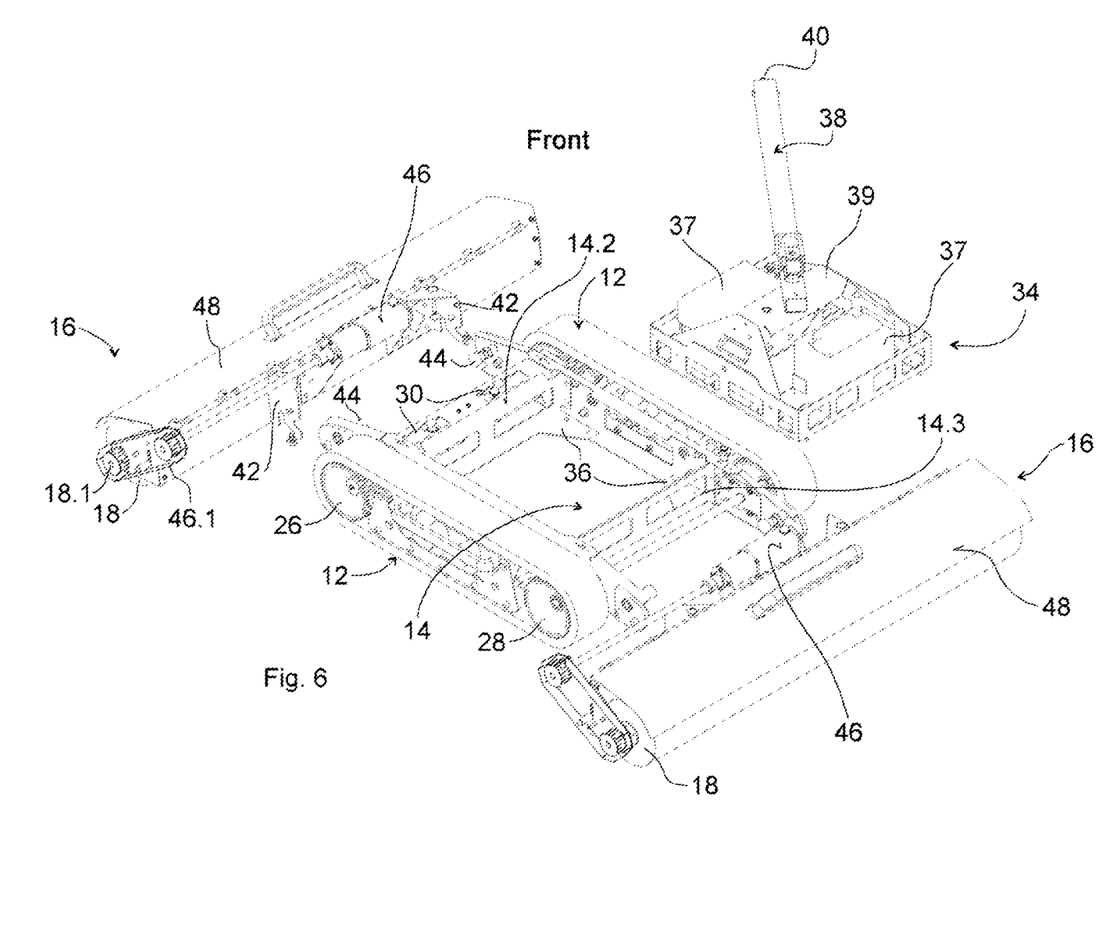
FIG. 6: an exploded view of the robot of FIG. 1.

Reference will now be made to FIG. 6. The propulsion group comprises two electric motors 32 mounted on the front profile 14.2 of the chassis 14. Each of the motors 32 is coupled, generally via a reduction gear (not shown), to a respective drive pulley 26. The chassis 14 forms a support frame for a basket 34 which is housed in the space defined by the profiles 14.1 to 14.3 and rests on corner plates 36. The basket contains a robot control module 10 as well as batteries 37 for powering the robot 10, which supply the electrical energy for all on-board equipments, including the control module, the propulsion motors and the motors of the brush modules 16.

The basket 34 still carries the water supply system which comprises an arm 38 pivoting through 360°. The pivoting arm 38 comprises a tube whose end, on the pivot side, is in communication with a valve 39 for distributing water to the two brushes. The other end of the tube of the pivoting arm 38 comprises a coupling 40 which allows its connection to a water supply hose.

It will be noted in FIG. 6 that the robot 10 is designed in four portions: the chassis 14, the basket 34 and the two brush-modules 16. This modular aspect allows an easy transport of the robot, in the disassembled state, by a single user. For example, he can carry the different portions of the robot individually on a ladder, to assemble the robot on a roof equipped with solar panels. This avoids the need for a lifting device.

The basket 34 is housed in the chassis 14 and is fixed thereto by means of a lock system (not shown), for example locking pins with axial lock which are engaged in the basket 34. The propulsion motors 30 are electrically connected to the control module by cables with waterproof connectors. The two brush-modules 16 each have fixing elements 42 which cooperate with corresponding elements 44 on the chassis 14, so as to form a removable fixation. As shown herein, grooved brackets 42 are engaged, by pivoting, on axes 44. This is only one example and other types of removable fixations can be considered.

Each brush 18 is coupled to a respective electric motor 46, typically by means of a toothed belt driving a pinion 46.1 on the axis of the motor and a pinion 18.1 on the axis of the brush 18. A cover 48 protects against upward projections.

Once the brush-modules 16 are mounted on the frame, the motors 46 are electrically coupled to the control module by cables with waterproof connectors. A supply pipe connected to the solenoid valve 39 is also positioned so as to open at each of the brushes 18.

The presence of a camera 50, fixed to the tip of a mast 52 mounted on the basket 34, will also be noted. The camera 50 allows visualizing the whole of the robot on the surface on which it moves or taking thermographic images of the photovoltaic power plant.

Figure 7:
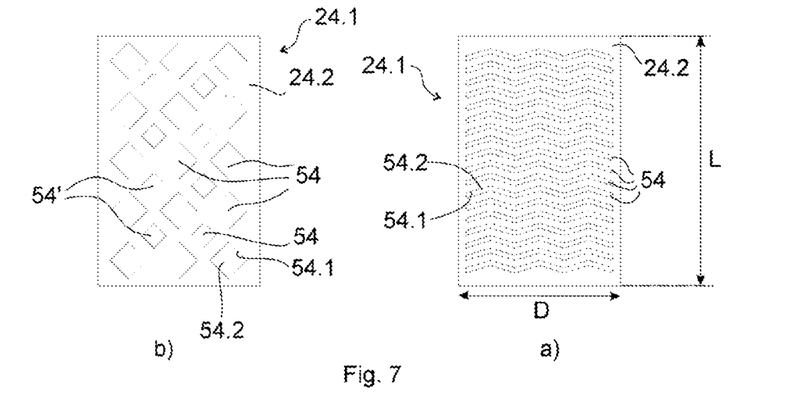
FIG. 7: two top views: a) pad equipping the track of FIG. 2, b) another pad profile.

FIG. 7 shows top views of two pad variants 24.1 having a contact surface 24.2 with a plurality of cavities 54 (or hollows) open on the contact surface 24.2 and forming a predetermined pattern.

The pads 24.1 have a rectangular shape corresponding substantially to the section of the blocks, that is to say a dimension D in the direction of the strip corresponding to d1 and a dimension L in the transverse direction corresponding to d2.

The cavities 54 are formed in the thickness of the pad and delimited by a wall surface 54.1 defining the periphery of the cavity (perpendicular to the plane of the contact surface 24.2) and a bottom surface 54.2 (parallel to the plane of the contact surface 24.2). Thus, the cavity delimited by each wall surface 54.1 intersects the contact face 24.2 along a closed ridge contour.

The surface cavity ratio is preferably less than 50%. The term "surface cavity ratio" means the ratio between the sum of the areas of the cavities (the area of each cavity is that defined by the closed ridge contour) and the total area of the pad (L×D).

The pads 24.1 can be manufactured in one piece (typically by molding) or by assembling two layers. They are made of a material having an appropriate hardness for a good adhesion. In this context, the pads have a dual function of water discharge and suction. When the pads lie flat on the surface of a solar panel, the combination between the weight of the robot and the shape of the cavities allows driving out the water under the cavities and causes a suction effect which provides an adhesion allowing holding the robot.

In the variant of FIG. 7 a), the pattern comprises cavities 54 in the form of wavy lines extending transversely to the length of the pad L. The lines comprise 6 rectilinear segments forming 3 periods. Once mounted, the lines are oriented in the lengthwise direction of the track 12.

In the variant of FIG. 7b), the cavities are disposed in an alternating pattern of square cavities. A line of three squares 54 of a side c1 is followed by a line of two squares, noted 54', of a side c2, staggered.

For example, the cavities have a depth of 2 mm or more and the area defined by the closed ridge contour is comprised between 12 and 80 mm², preferably between 16 and 36 mm².

The pads can be manufactured from an elastomer, in particular natural rubber, although synthetic rubbers can be considered, and preferably having a hardness in the range of 35 to 50 degrees Shore A, in particular between 40 and 45 degrees Shore A.

In the variant, the pads 24.1 are fixed by their rear face on the respective blocks by gluing.

Similarly, the blocks 22.1 are fixed to the strip 20 by gluing. However, the blocks and pads can be fixed by any appropriate means, they can also be removably sewn or fixed (e.g. textile hook and loop type).

In the presented variant, each block 22.1 is covered by a pad 22.1. It would however be possible to consider variants in which a block supports 2 or more pads. Moreover, the blocks 22.1 which are herein made from a single material could be composites, i.e. include an assembly of several different materials.

Figure 8:
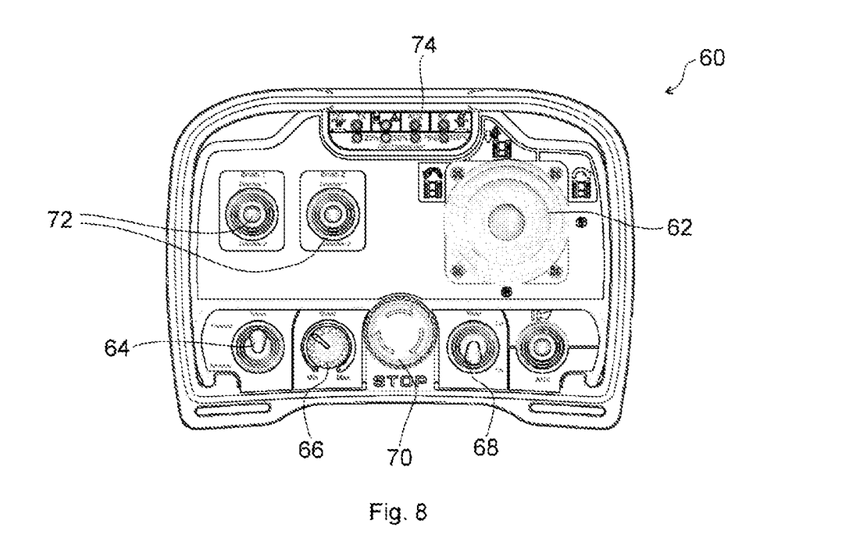
FIG. 8: top view of a remote control for the robot of FIG. 1.

The robot 10 is remotely controlled by an operator by means of a remote control 60 illustrated in FIG. 8. The remote control allows remotely managing the robot's functions. It comprises a battery-powered microprocessor electronic circuit associated with a radio-frequency transmitter communicating with a receiver associated with the control module on board the robot. The control panel of the remote control comprises in particular:
- directional lever 62 for the straight line displacement and the rotation of the robot;
- switch 64 for reversing the direction of travel;
- speed adjustment button 66;
- water supply switch 68;
- brush rotation adjustment buttons 70;
- emergency stop button 72; and
- band 74 of status indicators (LEDs).

The invention claimed is:

1. A drive track for a vehicle moving on inclined surfaces, said track having a multilayer structure comprising:
   - an inner layer formed by a continuous strip having an inner face capable of cooperating with means for driving the track;
   - an intermediate layer including a plurality of damping blocks disposed over an entire length of the continuous strip of the inner layer with a predefined spacing; and
   - an outer running layer coming into contact with the surface on which the track moves, the running layer being formed by pads carried by the damping blocks;
   wherein the damping blocks are made of an elastomer material and have a cellular structure.

2. The track according to claim 1, wherein the cellular structure comprises a plurality of parallel through channels.

3. The track according to claim 2, wherein the cellular structure is of the honeycomb type and the channels extend transversely to the length of the continuous strip.

4. The track according to claim 1, wherein each damping block has a parallelepiped shape, and supports, on a face parallel to the continuous strip of the inner layer, a pad.

5. The track according to claim 1, wherein said predetermined spacing corresponds to at least 5% or 20% of a thickness of a block.

6. The track according to claim 5, wherein said predetermined spacing corresponds to at least 40 or 50% of the thickness of a block.

7. The track according to claim 1, wherein the damping blocks are made of an elastomer having a hardness comprised between 60 and 80 degrees Shore A.

8. The track according to claim 7, wherein the damping blocks are made of an elastomer having a hardness comprised between 65 and 70 degrees Shore A.

9. The track according to claim 1, wherein the pad is substantially rectangular and extends across the width of the continuous strip of the inner layer.

10. The track according to claim 1, wherein the pads have a contact surface with a plurality of open cavities on the contact surface and forming a predetermined pattern, a surface cavity ratio being less than 50%.

11. The track according to claim 10, wherein the cavities are formed in the thickness of the pad and delimited by a wall surface and a bottom surface, each wall surface intersecting the contact face according to a closed ridge contour.

12. The track according to claim 11, wherein the cavities have a depth of 2 mm or more and the area defined by the closed ridge contour is comprised between 12 and 80 mm².

13. The track according to claim 12, wherein the area defined by the closed ridge contour is comprised between 16 and 36 mm².

14. The track according to claim 1, wherein the pads are made of an elastomer having a hardness in the range of 35 to 50 degrees Shore A.

15. The track according to claim 14, wherein the pads are made of an elastomer having a hardness between 40 and 45 degrees Shore A.

16. A robot for cleaning inclined surfaces comprising:
   - a chassis supporting a propulsion group;
   - a pair of drive tracks according to claim 1, mounted on either side of the chassis for the displacement of the robot, the tracks being supported and driven by means for driving the track cooperating with the propulsion group; and
   - at least one brush for cleaning the surface on which the robot moves.

17. The robot according to claim 16, further comprising:
   - two rotary cleaning brushes, mounted transversely to the axis of displacement of the robot, one brush at each end of the robot; and
   - brush drive means designed to drive the brushes in two directions.

18. The robot according to claim 16, wherein the chassis forms a support frame for a basket, the basket comprising a robot control module as well as batteries intended to power all on-board equipment, the propulsion group and the brush drive means.

19. The robot according to claim 18, wherein at least one of the cleaning brushes is mounted on the chassis by removable fixing means, and the basket is removably housed in the chassis.

20. The robot according to claim 16, wherein the number of pads of the track, their dimensions and surface cavity ratio are determined such that the pressure applied by the pads on the panels is less than about 5000 Pa.

* * * * *